Figure 1:
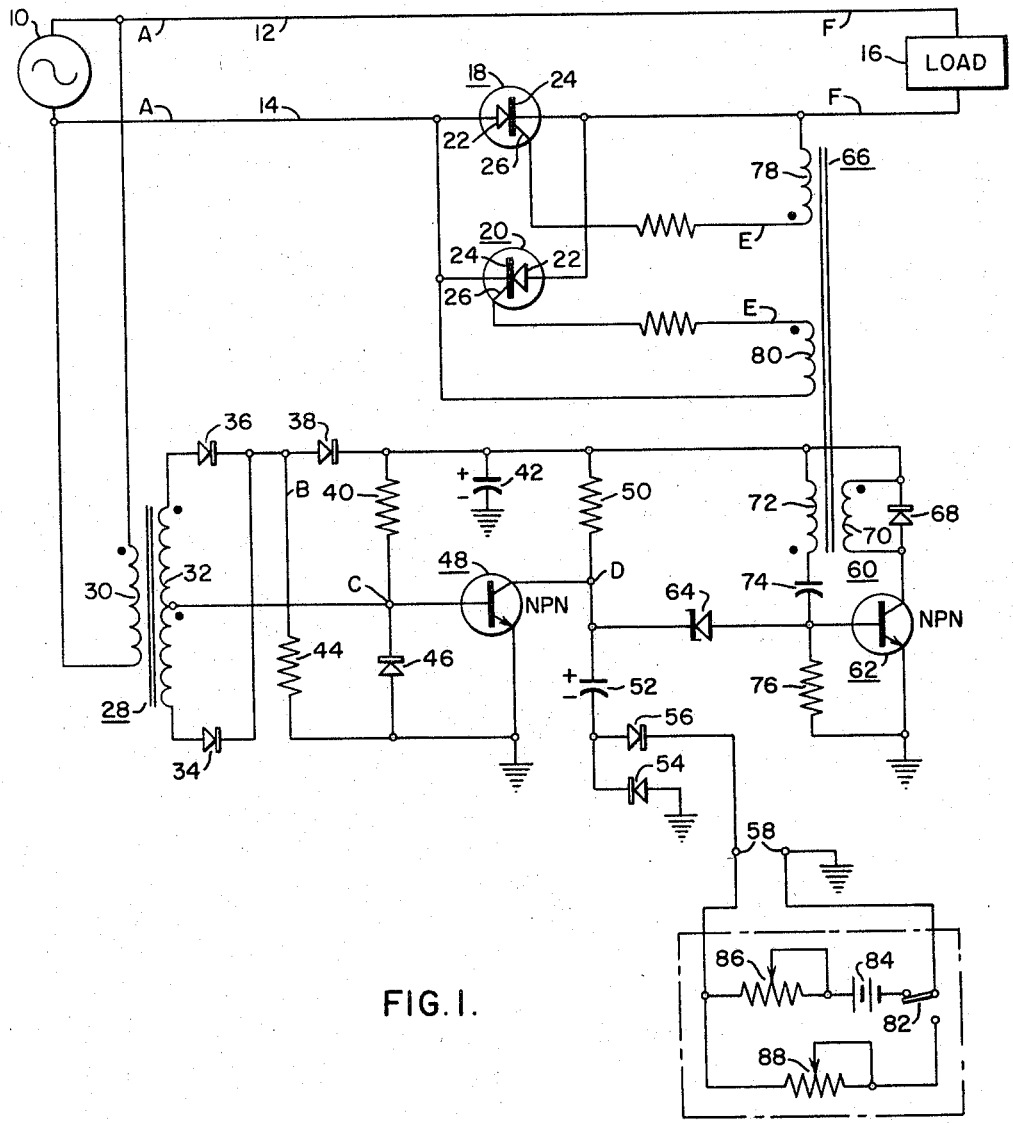

July 25, 1967   L. C. VERCELLOTTI   3,333,112
PULSE GENERATOR FOR PHASE CONTROLLED SYSTEMS
Filed Aug. 11, 1964   2 Sheets-Sheet 1

WITNESSES:
Bernard R. Gieg
James F. Young

INVENTOR
Leonard C. Vercellotti
BY  /s/ Brodahl
ATTORNEY

United States Patent Office 3,333,112
Patented July 25, 1967

3,333,112
PULSE GENERATOR FOR PHASE CONTROLLED SYSTEMS
Leonard C. Vercellotti, Penn Hills Township, Verona, Pa., assignor to Westinghouse Electric Corporation, East Pittsburgh, Pa., a corporation of Pennsylvania
Filed Aug. 11, 1964, Ser. No. 388,845
14 Claims. (Cl. 307—88.5)

This invention relates to pulse generating circuitry, and more particularly to apparatus for generating a train of pulses at least once during each cycle of an alternating current voltage, with the apparatus incorporating means for controlling the phase of the first pulse in each train with respect to the starting point of each cycle of the alternating current voltage.

While not limited thereto, the present invention is particularly adapted for use in alternating current phase control systems employing controlled semiconductive rectifiers, which, as is well known, are similar in operation to thyratrons. Such systems have found widespread use in controlling power supplied to an electrical load from an alternating current source and include, as essential circuit components, controlled silicon rectifiers or the like which are cut off at the beginning of a cycle of the alternating current source, but which are gated on after a predetermined time delay in the cycle whereby the rectifiers will deliver to the load only a selected part of the available power. Control is obtained by varying an input voltage or impedance such that the power supplied to the load is proportional to the input.

The present invention is concerned with phase control systems wherein controlled semiconductive rectifiers are fired in timed relationship with respect to the starting point of an alternating current voltage by a pulse train; and, as an overall object, the invention provides improved circuitry for generating a firing pulse waveform or controlled semiconductive rectifiers whereby proportional control may be obtained in a power supply system through a 0° to 180° range.

Another object of the invention is to provide improved circuitry for generating a firing waveform for controlled semiconductive rectifiers which produces a non-distributed gate pulse train, meaning that the gate pulse train is repeated each half cycle of the input alternating current source.

Still another object of the invention is to provide improved circuitry for generating non-distributed gate pulse trains in a phase control system wherein the phase of the first pulse in each pulse train will respect to the input alternating current signal may be controlled by either a voltage or an impedance.

In accordance with the invention, a pulse generator is provided including an oscillator having a normally cut-off electron valve therein and adapted to produce a train of pulses when the electron valve is rendered conducting during a cycle of an alternating current voltage, a capacitor, means for charging the capacitor at least once during each cycle of the alternating current voltage, and means for rendering the electron valve conductive when the voltage across the capacitor exceeds a predetermined magnitude.

Preferably, the aforesaid electron valve comprises a transistor having its collector inductively coupled to its base such that oscillations will be produced to generate the aforesaid pulse train when the voltage across the capacitor, applied to the base of the transistor through a Zener diode, initiates conduction. By controlling the time required to charge the capacitor to the Zener breakdown voltage by means of either a bias voltage or an impedance, the phase of the first pulse in each pulse train which fires the controlled semiconductive rectifiers in the power circuit can be varied to effect a proportional control. In order to reset the capacitor to its initial or quiescent voltage level, means including a transistor switch device is included to provide a discharge path for the capacitor at the zero crossings of the input alternating current voltage.

Figure 2:
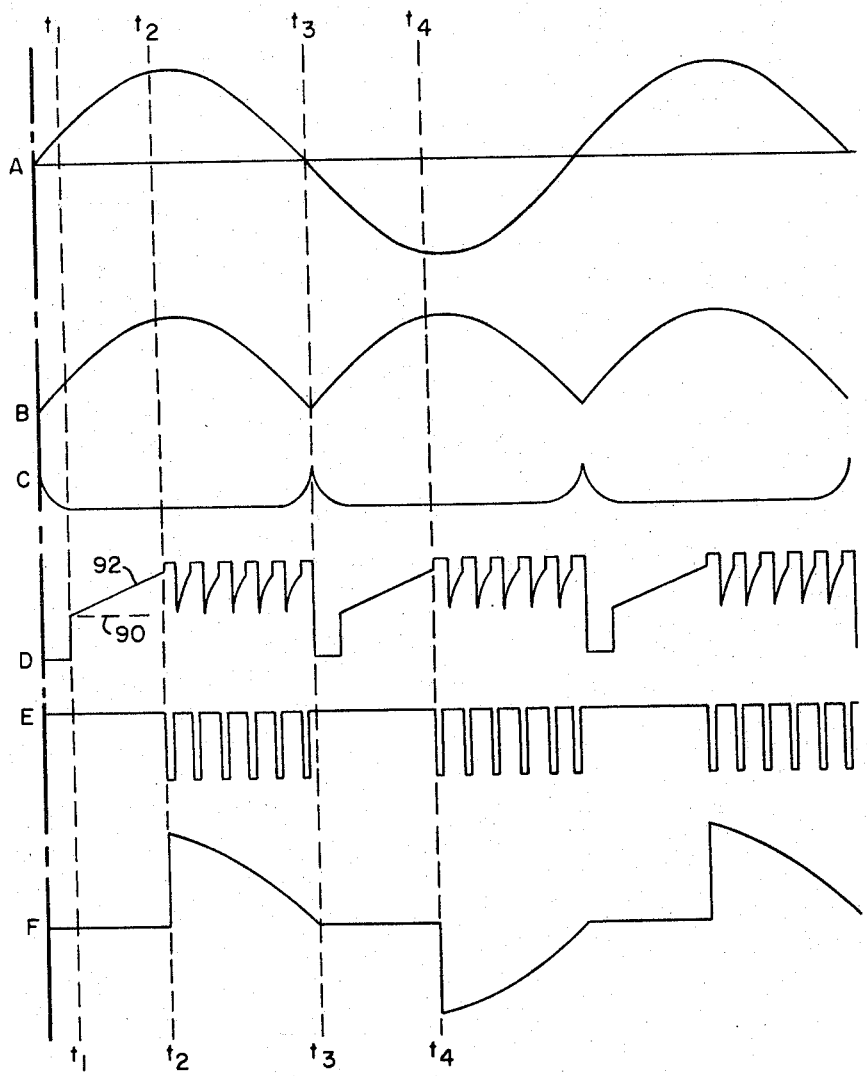

The above and other objects and features of the invention will become apparent from the following detailed description taken in connection with the accompanying drawings which form a part of this specification, and in which:

FIGURE 1 is a schematic circuit diagram of one embodiment of the invention as applied to a phase control system for silicon controlled rectifiers; and FIG. 2 illustrates waveforms appearing at various points in the circuit of FIG. 1 and which explain the operation of the circuit.

With reference now to the drawings, and particularly to FIG. 1, a power supply system is shown including a source of alternating current voltage 10 connected through conductors 12 and 14 to a load 16. Included in conductor 14 is a first silicon controlled rectifier 18; and in shunt with rectifier 18 is a second silicon controlled rectifier 20 arranged to conduct current in a direction opposite to the current passing through the rectifier 18.

As is well known to those skilled in the art, the silicon controlled rectifiers 18 and 20 are the equivalents of thyratrons. Each rectifier includes an anode 22, cathode 24 and a gate electrode 26. Each silicon controlled rectifier acts as a two-terminal switch and will block current flow in either direction until a critical break-over voltage is exceeded or until a positive voltage is applied to its gate electrode 26. By applying pulses to the gate electrodes 26 during the positive and negative half cycles of the alternating current voltage source 10 in delayed time relationship with respect to the zero crossings of the alternating current waveform, a portion of the power from source 10 can be applied to the load at 16, depending upon the time delay.

The circuitry for applying pulses to the gate electrodes 26 in timed relationship with respect to the zero crossings of alternating current waveform includes a transformer 28 having its primary winding 30 connected across the output of the alternating current voltage source 10. The secondary winding 32 of transformer 28 is center-tapped as shown and has its opposite ends connected through diodes 34 and 36 to the anode of diode 38. The cathode of diode 38 is connected through resistor 40 to the center-tap of secondary winding 32; and it will be appreciated that the arrangement just described comprises a full-wave rectifier which charges capacitor 42 with the polarity shown. The anode of diode 38 is connected to ground through resistor 44; and the center-tap of secondary winding 32 is connected to ground through diode 46.

Also connected to the center-tap of secondary winding 32 is the base of a NPN-transistor 48 having its emitter connected to ground and its collector connected to the junction of resistor 50 and ramp capacitor 52. One end of resistor 50 is connected to the cathode of diode 38 as shown; while the ramp capacitor 52 is connected to ground through the parallel combination of diode 54 and a circuit including diode 56 and a pair of input terminals 58. As will be appreciated, diodes 54 and 56 are connected to conduct current in opposite directions.

The circuitry incorporates a blocking oscillator 60 which includes a NPN-transistor 62 having its base connected through a Zener diode 64 to the junction of resistor 50 and capacitor 52. The collector and base of transistor 62 are inductively coupled by means of transformer 66 having a diode 68 connected in shunt with its primary winding 70. Feedback to the base of transistor 62 is achieved by means of winding 72 on transformer 66 and capacitor 74. The base of transistor 62 is connected to ground through resistor 76; and the emitter of this same transistor 62 is connected directly to ground as shown. Output pulses from the oscillator 60 are derived across output windings 78 and 80 and applied between the gate electrode 26 and cathode 24 of the silicon controlled rectifiers 18 and 20, respectively.

In order to control the phase relationship of the pulses appearing across windings 70 and 80 with respect to the input voltage from source 10, a variable voltage source or variable impedance is connected across input terminals 58. When switch 82 is in the position shown, a variable voltage may be applied across input terminals 58 by means of battery 84 and rheostat 86. Alternatively, with the switch 82 reversed with respect to the position shown in FIG. 1, a variable impedance may be applied across the input treminals 58, which variable impedance is illustrated as a rheostat 88.

Operation of the circuit of FIG. 1 may best be understood by reference to the waveforms of FIG. 2. Waveform A illustrates the atlernating current voltage at the output of source 10 and which is applied across the primary winding 30 of transformer 28. The full-wave rectified voltage across resistors 40 and 44 will, therefore, appear as waveform B in FIG. 2. During the major portion of each half cycle of the source 10, current flowing through resistor 44, which is of lesser impedance than resistor 40, and diode 46 will apply a negative potential to the base of NPN transistor 48, thereby cutting it off. However, at the zero crossings of the waveform A of FIG. 2, transistor 48 conducts. Thus, where the waveform A crosses the zero axis, the voltage on the base of transistor 48 increases in the positive direction shown by waveform C in FIG. 2, thereby initiating conduction in the transistor to discharge capacitor 52 through diode 54 and the collector-to-emitter circuit of transistor 48.

As the voltage applied to the circuit of FIG. 1 (waveform A) from source 10 increases, sufficient current flows through diode 46 to overcome the base drive applied from capacitor 42 through resistor 40, thereby cutting off the transistor 48. Consequently, at time $t_1$ the voltage at the collector of transistor 48 (waveform D in FIG. 2) rises abruptly to level 90 comprising the sum of the voltage across input terminals 58, the voltage across diode 56, and the voltage across the capacitor 52. The capacitor 52 is then charged along ramp 92 from capacitor 42 through resistor 50 until the breakdown voltage of Zener diode 64 is reached at time $t_2$, whereupon a positive voltage is applied to the base of transistor 62 to render it conducting. At this point, the blocking oscillator 60 breaks into oscillation. The oscillation continues until the next zero crossing of the input waveform A (time $t_3$, for example) where transistor 48 is again rendered conducting to discharge capacitor 52 back down to its initial voltage level. Thus, oscillations appearing as waveform E in FIG. 2 are produced across windings 78 and 80 of the blocking oscillator 60 between times $t_2$ and $t_3$ in the first half cycle. The first pulse in the group of pulses in waveform E will fire silicon controlled rectifier 18, for example, so that the first half cycle of the input voltage (waveform A) from source 10 will appear as waveform F as applied to the load 16. During the next half cycle, the process is repeated except that the silicon controlled rectifier 20 is caused to fire at time $t_4$. Since the initial voltage across capacitor 52 is dependent upon the input voltage applied across input terminals 58, the time delay involved in charging the capacitor 52 to the breakdown point of Zener diode 64 can be varied by controlling the voltage applied to terminals 58. This is accomplished very simply in accordance with the circuit of FIG. 1 by varying the adjustable tap on the rheostat 86.

Alternatively, if it is desired to employ an impedance control rather than voltage control, the switch 82 is reversed and the tap on rheostat 88 varied to vary the time required to charge capacitor 52 to the breakdown level of Zener diode 64.

The present invention thus provides an inexpensive and relatively simple phase shift circuit for alternating current phase controlled systems utilizing silicon controlled rectifiers or the like. It will be noted from waveform D in FIG. 2 that the ramp 92 has approximately the same slope for different control voltages applied to terminals 58. This insures good resolution and repeatability of pulse position over the input voltage range.

One advantageous feature of the invention is the independence of the blocking oscillator frequency and input voltage from source 10. This independence results from the non-loading of the base circuit of transistor 62 via capacitor 52 once the transistor 62 breaks into oscillation. The diode 56 becomes reversed biased when the feedback circuit drives the base negative, and the quiescent period of the blocking oscillator 60 is thus not affected by capacitor 52.

As mentioned above, the circuit of the invention may be controlled by a voltage or by an impedance. This is because the charging current for the capacitor 52 flows out of diode 56 into the control means. The circuit may be used, therefore, for phase shifting with a control voltage or parametric devices such as temperature sensitive resistors or magnetoresistors. If desired, the circuit can be made as independent of line voltage as desired by returning the charging resistor 50 to a Zener regulator. A plurality of pulses during each half cycle of the input voltage from source 10 facilitates firing of the silicon controlled rectifiers 18 and 20, notwithstanding phase changes due to inductive or capacitive loads.

Although the invention has been shown in connection with a certain specific embodiment, it will be readily apparent to those skilled in the art that various changes in form and arrangement of parts may be made to suit requirements without departing from the spirit and scope of the invention.

I claim as my invention:

1. In a phase control system, a power supply circuit adapted for connection to a source of input alternating current voltage, at least one controlled semi-conductive rectifier device in said power supply circuit adapted to block the flow of current through the power supply circuit, and means for firing said controlled semi-conductive rectifier device to permit current flow through the power supply circuit during a portion of each cycle of said alternating current voltage, said latter-mentioned means including an oscillator having a normally cutoff electron valve therein and adapted to produce a train of pulses when the electron valve is rendered conductive during a cycle of said alternating current voltage, a capacitor, means for charging said capacitor at least once during each cycle of said alternating current voltage, means for rendering said electron valve conductive when the voltage across the capacitor exceeds a predetermined magnitude, control means for controlling the length of time during a cycle of said alternating current voltage required to charge the capacitor to a voltage exceeding said predetermined magnitude, means for applying said train of pulses to the controlled semiconductive rectifier device to cause the same to fire, and means for discharging said capacitor at least once during each cycle of said alternating current voltage, said latter-mentioned means comprising a semi-conductive second device having an emitter, a collector and a base, means connecting said emitter and collector in shunt with said capacitor for discharging the capacitor through the semiconductive second device when that device is conductive, and means connected to the base of said semiconductive second device for rendering it conductive when the instantaneous voltage of said input alternating current voltage makes a zero crossing.

2. The combination of claim 1 wherein said control means comprises means for adjusting the voltage level from which said capacitor is charged during each cycle of said alternating current voltage.

3. The combination of claim 2 wherein said means for adjusting the voltage level comprises a control circuit connected to said capacitor and responsive to the receipt of control voltage for setting the voltage level from which the capacitor charges during each cycle of said alternating current in accordance with the magnitude of control voltage received by said control circuit.

4. The combination of claim 2 wherein said means for adjusting the voltage level includes a variable impedance connected to said capacitor.

5. In apparatus for producing at least one train of pulses during each cycle of an input alternating current voltage, and wherein the phase relationship of the first pulse in each train with respect to the starting point of a cycle of said alternating current voltage may be varied; the combination of an oscillator having a normally cutoff electron valve therein and adapted to produce said train of pulses when the electron valve is rendered conductive during a cycle of said alternating current voltage, a capacitor, means for charging said capacitor at least once during each cycle of said alternating current voltage, means for rendering said electron valve conductive when the voltage across the capacitor exceeds a predetermined magnitude, control means for controlling the length of time required to charge said capacitor to a voltage exceeding said predetermined magnitude, and means for discharging said capacitor at least once during each cycle of said alternating current voltage, said latter-mentioned means comprising a semiconductive device having an emitter, a collector and a base, means connecting said emitter and collector in shunt with said capacitor for discharging the capacitor through said device when the device is conductive, and means connected to the base of said semiconductive device for rendering it conductive when the instantaneous voltage of said input alternating current voltage makes a zero crossing.

6. The combination of claim 5 wherein said means for charging includes a full wave rectifier for rectifying said alternating current voltage.

7. The combination of claim 5 wherein said control means comprises means for adjusting the voltage level from which said capacitor is charged during each cycle of said alternating current voltage.

8. The combination of claim 7 wherein said means for adjusting the voltage level comprises a control circuit connected to said capacitor and responsive to the receipt of control voltage for setting the voltage level from which the capacitor charges during each cycle of said alternating current in accordance with the magnitude of control voltage received by said control circuit.

9. The combination of claim 7 wherein said means for adjusting the voltage level includes a variable impedance connected to said capacitor.

10. In apparatus for producing at least one train of pulses during each cycle of an input alternating current voltage, and wherein the phase relationship of the first pulse in each train with respect to the starting point of a cycle of said alternating current voltage may be varied; the combination of an oscillator including a normally cutoff first semiconductive device of the type having an emitter, a collector and a base, means inductively coupling said collector and said base whereby the oscillator is adapted to produce said train of pulses when the electron valve is rendered conductive during a cycle of said alternating current voltage, a capacitor, means for charging said capacitor at least once during each cycle of said alternating current voltage, means including a Zener diode for applying the voltage across said capacitor between the emitter and base of said semiconductive device such that the semiconductive device will be rendered conductive when the voltage across the capacitor exceeds a predetermined magnitude determined by the breakdown voltage of the Zener diode, control means for controlling the length of time required to charge said capacitor to a voltage exceeding said predetermined magnitude, and means for discharging said capacitor at least once during each cycle of said alternating current voltage, said latter-mentioned means comprising a second semi-conductive device having an emitter, a collector and a base, means connecting the emitter and collector of the second semiconductive device in shunt with said capacitor for discharging the capacitor through the second semiconductive device when that device is conductive, and means connected to the base of the second semiconductive device for rendering it conductive when the instantaneous voltage of said input alternating current voltage makes a zero crossing.

11. The combination of claim 10 which further comprises a load circuit having therein a controlled semiconductive rectifier device for controlling the flow of load current, and means for applying said train of pulses to said controlled semiconductive rectifier device to cause the same to fire.

12. The combination of claim 10 wherein said control means comprises means for adjusting the voltage level from which said capacitor is charged during each cycle of said alternating current voltage.

13. The combination of claim 12 wherein said means for adjusting the voltage level comprises a control circuit connected to said capacitor and responsive to the receipt of control voltage for setting the voltage level from which the capacitor charges during each cycle of said alternating current in accordance with the magnitude of control voltage received by said control circuit.

14. The combination of claim 12 wherein said means for adjusting the voltage level includes a variable impedance connected to said capacitor.

References Cited
UNITED STATES PATENTS

| 2,981,898 | 4/1961 | St. John | 331—112 |
| 3,187,271 | 6/1965 | De Vries | 331—112 X |
| 3,243,711 | 3/1966 | King et al. | 307—88.5 |

ARTHUR GAUSS, *Primary Examiner.*

D. D. FORRER, *Assistant Examiner.*